Patented May 28, 1940

2,202,174

UNITED STATES PATENT OFFICE 2,202,174

METHOD FOR MANUFACTURING MATERIALS FOR PURIFICATION OF GASES

Frank A. Sullivan, Elizabeth, N. J.

No Drawing. Application January 27, 1938,
Serial No. 187,221

2 Claims. (Cl. 252—2.5)

This invention relates broadly to the production of a material which will effectively remove hydrogen sulphide and other sulphur compounds from gaseous mixtures such as coal gas, water gas, refinery gases and the like and more particularly to the production of iron oxide or iron hydroxide for use in the purification of such gaseous mixtures.

In the purification of commercial gases, oxide of iron (or the hydroxide) reacts with the hydrogen sulphide in accordance with the familiar reaction:

$$Fe_2O_3.x(H_2O) + 3H_2S \rightarrow Fe_2S_3 + 3H_2O + xH_2O$$

It has been found that this reaction is attended with much uncertainty due to the low concentration of the hydrogen sulphide and other sulphur impurities in the gases to be purified and due to the many other factors which arise to hinder and complicate the complete combination of all the hydrogen sulphide present with the iron oxide. It is, however, imperative, in providing a gas suitable for domestic and commercial employment that these sulphur impurities be completely removed.

Due to the difficulty of completely removing the dilute mixture of hydrogen sulphide, particularly the so-called "last traces" or last five or ten grains of hydrogen sulphide per hundred cubic feet of gas, from the gaseous mixtures, very uneconomical methods of purification, as regards the complete use of the purifying material, are frequently resorted to, entailing premature discarding of the iron oxide before much of its capacity for combining with the sulphur impurities has been reached. It will be evident, then, that a purification material which effectively and economically removes the sulphur impurities, and particularly the last traces of sulphur impurities, from commercial gases, is of prime importance both for low purification cost and for smooth operation of the gas producing plant as a whole.

One object of this invention is a material which will rapidly and completely remove all traces of hydrogen sulphide from gaseous mixtures passed through it at high rates of flow and thereby permit of efficient purification under conditions which now result in faulty operation of the purification system.

Another object of the invention is an iron oxide or iron hydroxide which is formed with an extreme degree of surface area and, therefore, with pronounced absorptive qualities for gases, vapors and liquids.

A further object of the invention is a process by which iron oxide or iron hydroxide having the desired absorptive properties may be produced.

It is also an object of the invention to provide a so-called "dispersing medium" with which finely divided iron may be mixed for oxidation to produce an oxide or hydroxide with the characteristics desired.

Still another object of the invention is a dispersing medium having pronounced water absorptive properties, which water absorptive properties insure the formation of an iron oxide or iron hydroxide having the optimum state of hydration.

The invention also seeks a process by which the iron oxide or hydroxide shall be formed as a reversible hydrogel in the presence of a material having colloidal properties, for instance, a protective colloid.

Yet another object of the invention is a process for the manufacture of an iron oxide or hydroxide which is practical from the standpoint of cheapness, simplicity and efficiency of operation.

These and other objects of the invention and the means for their attainment will be more apparent from the following detailed description of a preferred embodiment of the process.

Iron of relatively small particle size is added to a dispersing medium in a tank to which is added an excess quantity of water. The quantity of water may be varied. The iron used is, preferably, finely ground iron borings but the particle size is immaterial to the process.

The dispersing medium may be organic or inorganic in its nature or a combination of both. Its function is, apparently, to encourage the formation of the iron oxide or iron hydroxide with an extreme degree of surface area which gives to it pronounced absorptive power for gases, vapors and liquids. It should be in particle or fibre form. The dispersing medium has, preferably, but not necessarily, pronounced water absorptive properties. Such properties are not essential to the attainment of the desired surface condition, absorptive power and purification characteristics, but when present, they ensure that the iron oxide or iron hydroxide shall be formed with and shall retain in the $Fe_2O_3$ molecule the optimum degree of water conducive to efficient purification of gaseous mixtures. It is to be noted that the term "dispersing medium" is not used in a chemical sense but merely to designate the solid or semi-solid material added to the iron to be oxidized and in admixture with which the oxidation is effected.

Best results have been obtained when the dispersing medium is a fibrous vegetable material, such as a hydrated cellulose bearing material and specifically a pulp made of wood, paper, rags or the like. It is preferred to use a waste paper, beaten up to a pulp, as the dispersing medium.

As examples of inorganic dispersing media, but by no means all, may be listed clay, calcium carbonate, asbestos (magnesium silicate) and alumina. Some examples of organic substances are carbohydrates such as starch, flour, hair and pulped felt.

The quantity of iron in the admixture is preferably in excess of that of the dispersing medium, say, approximately one and one-half to two parts of iron to one part of the dispersing medium. The quantity of water is preferably about eighty to eighty-five percent of the mixture.

The admixture is agitated and, conveniently, aerated. The oxidation may take place either with or without the aid of heat. When a satisfactory degree of oxidation has been effected the mixture is brought to a predetermined degree of alkalinity by the addition of, say, 2% to 5% of an alkali such as caustic soda or lime.

A specific example of an admixture formed in accordance with this invention is given as follows:—

| | | |
|---|---|---|
| Ground iron borings | tons | 45 |
| Pulp | do | 30 |
| Water | gallons | 100,000 |

Another example is:

| | | |
|---|---|---|
| Ground iron borings | tons | 20 |
| Pulp | do | 10 |
| Water | | An excess |

While the purification medium, for instance, the hydroxide of iron, may possess colloidal properties, colloidal substances, e. g., a protective colloid, may also be added, in some situations, to the iron and the substance serving as the dispersing medium. Or the dispersing medium may possess colloidal properties. The colloidal substance functions to influence the nature of the iron oxide or iron hydroxide to the end that it shall be formed as a reversible hydrogel, which is the most efficient state in which it can exist for combinations with hydrogen sulphide.

Oxidizing agents may be used when advisable and the hydrogen ion concentration of the mix being oxidized is controlled and varied by the addition of alkali or acid, as required.

Promoters and/or catalytic agents may also be employed. Thus iron oxide or iron hydroxide may be used as a promoter.

Upon completion of the oxidation process, excess water is removed. The admixture is dried and ground, ready for use. The mixture may then be mixed with shavings and used as in the known methods of gas purification.

Another method of manufacturing the purifying material which gives satisfactory results is to mix, say, 20 parts of iron borings with from 5 to 10 parts of the dispersing medium in an excess quantity of water and after thoroughly mixing these ingredients, adding to the admixture about 5 parts of sawdust as a carrier or thickener. The sawdust serves to prevent the admixture from flowing. The admixture may then be spread in considerable thickness on a platform to dry and as it dries, the sawdust permits the flow of air through the interstices and thus oxidation is facilitated. The sawdust does not function as a dispersing medium, since without the intimate mixture of the hydrated cellulose and iron, the improved results are not attained.

It has been demonstrated that the product of the process herein described is more effective than the iron oxides or iron hydroxides mixed with shavings previously used in gas purification. An admixture of seven parts of iron borings and one part of pulp with water in excess has been mixed with from six to ten parts of shavings. The iron commences to oxidize immediately and in due course iron oxide or hydroxide is formed on the shavings. This proportion of iron above indicated gives equivalent results to prior processes where larger quantities of iron, say, nine to ten parts, are mixed with the same quantity of shavings.

The purifying material produced by the process hereinbefore described permits the passage of gases therethrough in the purification process at many times the rate permissible through purifying materials heretofore known and the length of time during which the oxide of this invention will remove the last traces of sulphur impurities is many times that of other commercial material from whatever source.

Various modifications and substitutions will occur to those skilled in the art in the various illustrative ingredients recited in the foregoing description of the process producing the iron oxide having the characteristics desired and no limitation is intended by the phraseology hereinbefore used, except as indicated in the appended claims.

What is claimed is:

1. The method of preparing a compound of the character described comprising mixing finely divided iron with paper pulp and water and agitating and aerating the admixture until the desired oxidation of the iron is effected.

2. The method of preparing a compound of the character described comprising mixing substantially seven parts of finely divided iron, one part of paper pulp and an excess quantity of water, adding from six to ten parts of shavings to the admixture and exposing the admixture to air until the iron is oxidized to a predetermined degree.

FRANK A. SULLIVAN.